Oct. 7, 1958  G. V. MUMFORD  2,854,694
METHOD AND APPARATUS FOR FORMING BODIES FROM
PLASTIC MATERIALS
Filed Feb. 16, 1956

INVENTOR
G. V. MUMFORD
BY
Rule y Hoge
ATTORNEYS

United States Patent Office 2,854,694
Patented Oct. 7, 1958

2,854,694

METHOD AND APPARATUS FOR FORMING BODIES FROM PLASTIC MATERIALS

George V. Mumford, Toledo, Ohio, assignor to Owens-Illinois Glass Company, a corporation of Ohio Application February 16, 1956, Serial No. 565,978

13 Claims. (Cl. 18—19)

My invention relates to methods and apparatus for forming hollow articles or containers from materials in plastic condition, such as hot thermoplastic material or other material in sheet form. In prior art methods of forming hollow containers or other articles by molding, stretching, and blowing operations, the bottoms of such articles and the top portions can be formed of adequate thickness; however, the amount of material available for side wall distribution is inadequate, resulting in extremely thin walls.

An object of the present invention is to overcome this difficulty and provide a practical method and means by which hollow containers may be formed by a stretching and blowing operation with side walls of adequate thickness.

In accordance with the present invention the material in sheet form and in a plastic condition is positioned over a female mold which may be of hollow cylindrical form and is gripped between the mold and a hold down element. The material is then pressed between a plunger and bottom plate and also pressed at the same time between the body mold and hold down member in a manner to thicken and increase the volume of the plastic material surrounding the plunger, thus accumulating sufficient material for forming side walls of adequate thickness. This accumulated material is stretched downward to form the side walls by downward movement of the male die or plunger and the bottom plunger relative to the hollow mold.

Referring to the accompanying drawings the Figs. 1 to 4 are sectional elevations of the forming apparatus, the several figures showing progressive steps in the formation of the article.

Figure 1:
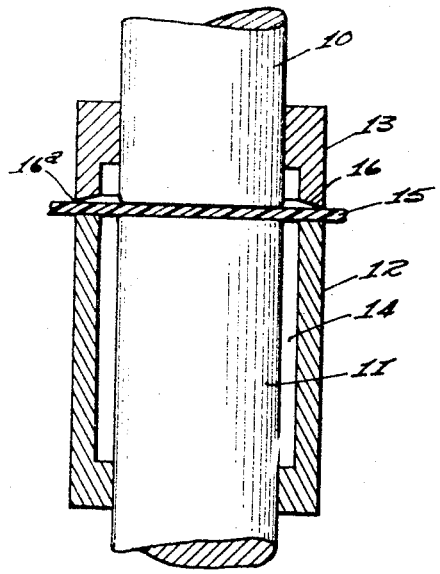
Fig. 1 shows the initial position of the parts when brought into contact with the sheet of plastic material.

Referring to the drawings, the molding elements include a cylindrical plunger 10 which constitutes the male mold member, a cylinder 11 beneath and in vertical alignment with the plunger 10, the element 11 forming a bottom plate for molding the bottom surface of the plastic article and also serving as an ejector pin. The female mold 12, herein referred to as the body mold, is in the form of a hollow cylinder in which the plastic article is blown. The internal diameter of the mold is greater than the diameter of the plunger 11, thereby providing an annular space 14 in which the plastic material is drawn to form the body of the article. The hold down element 13 cooperates with the body mold 12 as presently described.

The plastic material to be molded may be a hot thermoplastic in the form of a sheet 15. This sheet is brought into position over the mold 12 and the hold down 13 is then lowered to contact the sheet as shown in Fig. 1. The hold down 13 has a bottom rim surface 16 which is downwardly and outwardly inclined or flared with its outer circular edge 16ª in vertical register with the outer surface of the mold 12 therebeneath. The bottom plate or plunger 11 has its upper surface in the same plane with the top surface of the mold 12. The plunger 10 and hold down element 13 are moved downward to seat on the sheet 15 as shown in Fig. 1.

Figure 2:
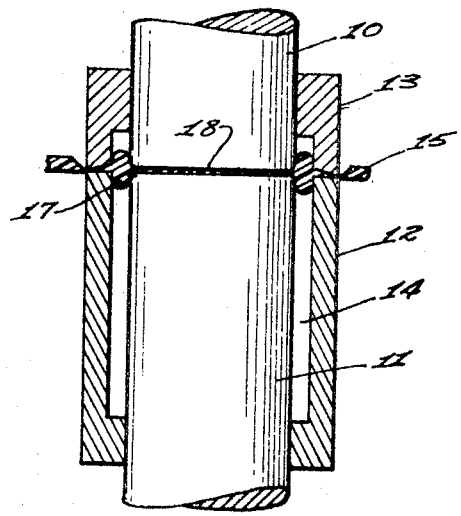
Fig. 2 shows the relation of parts when the material has been squeezed to form the bottom of the article and to accumulate material for forming the side walls of the article.

The next step in the operation consists in moving the plunger 10 and hold down 13 downwardly relative to the mold 12 and plunger 11, thereby squeezing the material so that a portion of it accumulates in the form of a ring or annular body 17 surrounding the plungers 10 and 11. This accumulation provides a supply of material which in the succeeding step is drawn to form the body of the container. The compression of the material as in Fig. 2 at the same time reduces the thickness of the sheet 15 between the plungers and thus forms the bottom 18 of the article which is being formed.

Figure 3:
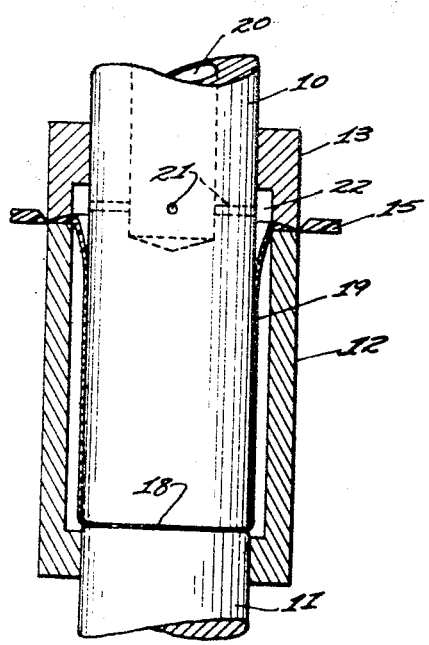
Fig. 3 illustrates a further step in which the material has been drawn to form the side walls.

The next step consists in moving the plungers 10 and 11 as a unit downwardly relative to the mold 12, thereby stretching the material 17 and forming the side walls 19. During this step the bottom plate 11 is brought to a position with its upper surface just above the inner bottom surface of the mold 12, as shown in Figs. 3 and 4.

Figure 4:
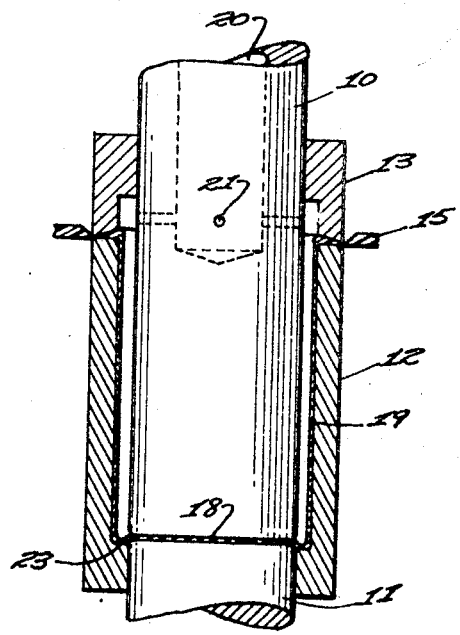
Fig. 4 illustrates the final step in which the material is blown within the mold.

The next step consists in blowing the hollow article within the mold 12 as shown in Fig. 4. The plunger 10 is formed with a cylindrical bore 20 communicating with lateral openings 21 extending through the wall of the plunger and opening into an annular space or chamber 22 within the hold down 13. The air pressure supplied through the plunger 10 is thereby applied to the inner surface of the walls 19 and spreads the material, causing it to conform the inner wall surface of the mold 12 and also forms the rim or projection 23 surrounding the reentrant bottom 18. After the body of the article is formed within the mold 12 the bottom plate or plunger 11 which serves as an ejector pin and the plunger 10 are moved upwardly relative to the mold 12 for ejecting the article from the mold. The upper end portion or rim of the article is finished by known methods which are not a part of the present invention.

Modifications may be resorted to within the spirit and scope of my invention.

I claim:

1. The method of forming a hollow body from material in plastic form which comprises reshaping a portion of a sheet of said material and thereby forming an accumulated body of the material in annular form surrounding a circumscribed portion of the sheet, thereafter producing a relative movement of said circumscribed portion and the accumulated body in a direction normal to said circumscribed portion and thereby stretching and attenuating the accumulated body to form a wall portion of the article.

2. The method of forming a tubular or hollow article from a flat sheet of material in plastic form, which method comprises pressing a circumscribed area of the sheet between surfaces on opposite sides of the sheet and thereby reducing the thickness of the sheet within said area and concurrently accumulating an annular body of the material surrounding said area and integral with the material within said area, and bodily moving the circumscribed portion of the sheet relative to said accumulated body in a direction normal to said sheet and thereby stretching the accumulated body to form side walls of an article integral with the said circumscribed portion of the sheet.

3. The method defined in claim 2, said method including applying opposing pressures to opposite sides of the sheet at a circumference surrounding and spaced from said circumscribed area and thereby confining the accumulating material between said area and said circumference.

4. The method which comprises compressing an area of a sheet of material in plastic condition between surfaces on opposite sides of the sheet, thereby spreading the material outwardly from between said surfaces and reducing the thickness of the sheet within said area and concurrently accumulating the material in an annular body surrounding said area and thereafter moving said surfaces and the material therebetween as a unit in a direction perpendicular to said surfaces and thereby stretching the said body of accumulated material to form a wall extending from the material between said surfaces and in a direction perpendicular thereto.

5. The method defined in claim 4, said method including expanding the walls of said material within a mold cavity and thereby molding the material.

6. The method of forming a hollow article which comprises forming a sheet of plastic moldable material in plastic condition, compressing a circumscribed area of the sheet between pressure surfaces and thereby forcing a portion of the material outwardly from between said surfaces and thereby accumulating an annular body of the material surrounding said area, gripping said sheet between annular gripping surfaces surrounding and spaced from said area, and thereafter bodily moving said pressure surfaces relative to said annular gripping surfaces and in a direction normal to said pressure surfaces and thereby drawing the accumulated material to form side walls integral with the material between said pressure surfaces.

7. The method defined in claim 6, said method including confining the drawn material within a mold cavity and expanding the drawn material within the mold cavity by pneumatic pressure.

8. The method of forming a hollow body from a flat sheet of material in a plastic condition, which method comprises applying balanced pressures on opposite sides of the sheet within and throughout a defined area and thereby forcing a portion of the material within said area outwardly beyond the confines of said area and thereby accumulating a portion of the material in the form of an annular body surrounding said area, said body of accumulated material being integrally united with the remaining portion of the material within said area, and thereafter stretching said annular body in a direction normal to the sheet and thereby forming said body into side walls of the article, with said side walls integral with the said portion of the sheet within said defined area.

9. The method defined in claim 8, said method including applying additional balanced pressures to opposite sides of the sheet, said additional pressures being confined to a narrow band of the sheet surrounding and spaced from the said defined area and thereby forcing additional material into the accumulating annular body.

10. An apparatus for forming a container, comprising a pair of axially aligned pistons having adjacent complementary end surfaces of cross-sectional contour corresponding to that of the container bottom, a pair of mold-enclosing casing sections, one of said casing sections having an interior surface spaced from the peripheries of said pistons and of a contour corresponding to that of the exterior surface of the container, said sections having adjacent mating open ends terminating in shoulders for abutting a plastic sheet interposed therebetween and extending across the interior of the mold enclosed by the sections, said pistons being movable relative to one another and jointly displaceable relative to said mold to form an open-topped plastic bag supported by the section open ends and extending into the mold, and a fluid pressure passage in one of said pistons establishing communication between the mold interior and a source of fluid under pressure to blow the bag outwardly into contact with said interior surface of said one casing section.

11. An apparatus for forming a generally cylindrical shape from a sheet of plastic material, comprising an open-topped mold of generally cylindrical shape, an upper cylindrical hold down element cooperable with said mold to close the open top thereof and to clamp a sheet of plastic material inserted therebetween to span the mold open top, a lower plunger and an upper plunger concentric with and projecting through said mold and hold down elements, respectively, into opposed relation to engage medial lower and upper surface portions, respectively, of said sheet as clamped, said plungers being relatively movable to squeeze said medial portions therebetween and to displace a portion of said sheet into the annular space between said plungers and said mold and hold down element, and said plungers being jointly movable to displace the squeezed medial portions of said sheet axially of said mold to form an open-topped, generally cylindrical shape, the bottom of which is defined by said squeezed medial sheet portions and an air passage in one of said plungers for introducing air into said shape to deform the same outwardly against the inner surface of said mold.

12. An apparatus for forming a container from a sheet of plastic material, comprising an open-topped mold having an interior surface defining the exterior contour of said container and an annular exposed upper edge, an upper hold down element superimposed over said mold to close the open top thereof and having a lower annular exposed edge cooperable with the mold annular edge to clamp therebetween peripheral portions of a sheet of plastic material spanning the mold open top, a lower plunger and an upper plunger projecting through said mold and hold down element, respectively, into opposed relation to engage medial lower and upper surface portions, respectively, of said sheet as the sheet is clamped by the mold and hold down element, the outer peripheral surfaces of said plungers being spaced from the inner surface of said mold, a fluid pressure passage in said upper plunger connectible to a source of fluid under pressure to introduce such fluid into the space between said plungers and said mold and hold down element, said plungers being relatively movable to squeeze said medial sheet portions therebetween and to displace a portion of said sheet into the annular space between said plungers and said mold and hold down element, and said plungers being jointly movable relatively to the mold to displace the squeezed medial portions of said sheet axially of said mold prior to the introduction of fluid through the upper plunger passage for blowing the sheet into contact with the mold to form an open-topped container, the bottom of which is defined by said squeezed medial sheet portions, and the size and shape of which is determined by the interior contour of said mold.

13. The combination of a mold formed with a cylindrical mold cavity opening through the top end of the mold, the mold comprising a bottom with a circular opening therethrough concentric with and of smaller diameter than the mold cavity, a cylindrical plunger extending upwardly through said bottom opening into position to engage the bottom surface of a sheet of plastic material positioned over and covering the open end of the mold, said plunger being of substantially the same diameter as said bottom opening and closing said opening, a second plunger positioned over the mold in register with the first mentioned plunger and having a bottom surface to seat on said sheet, a hold down element surrounding said second plunger and having a gripping surface over and in register with the side walls of the mold for gripping the sheet between the hold down element and the mold, the second plunger and said hold down being movable relative to one another and relative to said mold and said element, the mold and hold down element together with the plungers defining an unobstructed annular mold cavity extending throughout the length of the mold and closed at the top and bottom, the upper plunger and hold down element being movable downwardly to grip the sheet and to squeeze a portion of the material out from between the plungers and from between the mold and the hold down element into the said mold cavity and thereby form within said cavity an annular accumulation of plastic material joined to said sheet, said plungers being movable downwardly as a unit within the mold while said unobstructed space is maintained to stretch the said body of material into the side walls of a hollow article, the material between the plungers forming the bottom wall of said article, and an air passage in said second plunger for introducing air into said hollow article to expand the same radially into conforming contact with said mold.

References Cited in the file of this patent

UNITED STATES PATENTS

| | | |
|---|---|---|
| 1,575,300 | Weeks et al. | Mar. 2, 1926 |
| 2,230,189 | Ferngren | Jan. 28, 1941 |